US007791599B2

(12) United States Patent
Baek et al.

(10) Patent No.: US 7,791,599 B2
(45) Date of Patent: Sep. 7, 2010

(54) LIQUID CRYSTAL DISPLAY AND DRIVING METHOD THEREOF

(75) Inventors: Jong Sang Baek, Kumi-shi (KR); Chang Gon Kim, Daegu-shi (KR)

(73) Assignee: LG Display Co., Ltd., Seoul (KR)

(*) Notice: Subject to any disclaimer, the term of this patent is extended or adjusted under 35 U.S.C. 154(b) by 755 days.

(21) Appl. No.: 09/893,559

(22) Filed: Jun. 29, 2001

(65) Prior Publication Data

US 2002/0075255 A1 Jun. 20, 2002

(30) Foreign Application Priority Data

Dec. 15, 2000 (KR) .............................. 2000-76850

(51) Int. Cl.
*G09G 3/36* (2006.01)
*G09G 5/00* (2006.01)
*G06F 3/038* (2006.01)
*G09G 5/02* (2006.01)

(52) U.S. Cl. .......................... 345/204; 345/87; 345/99; 345/211; 345/212; 345/213; 345/699

(58) Field of Classification Search .................. 345/87, 345/99, 204, 211–213, 699
See application file for complete search history.

(56) References Cited

U.S. PATENT DOCUMENTS

| | | | | |
|---|---|---|---|---|
| 4,996,596 | A | 2/1991 | Hirao et al. | |
| 5,455,493 | A | 10/1995 | Pulluru et al. | |
| 5,686,846 | A * | 11/1997 | Holcomb et al. | 327/37 |
| 5,713,040 | A * | 1/1998 | Lee | 345/214 |
| 6,014,177 | A | 1/2000 | Nozawa | |
| 6,020,879 | A | 2/2000 | Nakabayashi | |
| 6,037,814 | A | 3/2000 | Hirakawa | |
| 6,069,619 | A | 5/2000 | Kim | |
| 6,097,440 | A | 8/2000 | Omori et al. | |
| 6,329,975 | B1 * | 12/2001 | Yamaguchi | 345/213 |

(Continued)

FOREIGN PATENT DOCUMENTS

| | | | |
|---|---|---|---|
| DE | 4403374 | A | 9/1994 |

(Continued)

*Primary Examiner*—Alexander S. Beck
(74) *Attorney, Agent, or Firm*—McKenna Long & Aldridge

(57) ABSTRACT

A liquid crystal display device and a driving method thereof that are adaptive for detecting a presence and a frequency range of an input signal applied to the liquid crystal display. In the device, a timing controller is provided with a signal presence determiner for detecting an application of an input signal from an interface. The signal presence determiner is provided with an oscillator for generating a reference clock having the same frequency as a horizontal synchronizing signal and a pre-synchronizing signal having the same frequency as a vertical synchronizing signal, a period detector for comparing a data enable signal from the exterior thereof with the reference clock to output a period of the input signal with the aid of a detection reference signal and the pre-synchronizing signal, a period comparator for comparing a period range between a desired maximum value and a desired minimum value of the input signal, and signal presence/absence comparing means for determining a presence/absence of the input signal in response to a pulse number of the input signal detected within a period range between the maximum value and the minimum value during an application interval of the detection reference signal.

6 Claims, 9 Drawing Sheets

U.S. PATENT DOCUMENTS 6,525,720 B1 * 2/2003 Baek .......................... 345/213

FOREIGN PATENT DOCUMENTS

| | | | | |
|---|---|---|---|---|
| EP | 0 647 933 | A1 | | 4/1995 |
| GB | 2 355 840 | A | | 5/2001 |
| GB | 2 355 840 | A1 | | 5/2001 |
| GB | 2 356 300 | A | | 5/2001 |
| GB | 2 368 445 | A | | 5/2002 |
| JP | 59023971 | A | | 2/1984 |
| JP | 59023971 | A | | 7/1984 |
| JP | 61-188193 | | | 8/1986 |
| JP | 62-103621 | | | 5/1987 |
| JP | 07086893 | A | * | 3/1995 |
| JP | 07-115598 | | | 5/1995 |
| JP | 08-254969 | | | 10/1996 |
| JP | 9-270936 | | * | 10/1997 |
| JP | 09258699 | | | 10/1997 |
| JP | 09270936 | | | 10/1997 |
| JP | 090258699 | A1 | | 10/1997 |
| JP | 090270936 | A1 | | 10/1997 |
| JP | 10-171417 | | | 6/1998 |
| JP | 11-109908 | | | 4/1999 |

* cited by examiner

LIQUID CRYSTAL DISPLAY AND DRIVING METHOD THEREOF

This application claims the benefit of Korean Patent Application No. 2000-76850, filed on Dec. 15, 2000, under 35 U.S.C. §119, the entirety of which is hereby incorporated by reference as if fully set forth herein.

BACKGROUND OF THE INVENTION

1. Field of the Invention

This invention relates to a liquid crystal display, and more particularly to a liquid crystal display and a driving method thereof that are adaptive for detecting a presence of an input signal applied to the liquid crystal display.

2. Description of the Related Art

Generally, a liquid crystal display (LCD) has been employed a notebook PC, an office automation equipment and an audio/video equipment, etc. owing to advantages of a small dimension, a thin thickness and a low power consumption. In particular, an active matrix liquid crystal display using thin film transistors (TFT's) as switching devices is suitable for displaying a dynamic image.

FIG. 1 is a block diagram showing a configuration of the conventional LCD. In FIG. 1, an interface part 10 receives a data (RGB data) and control signals (e.g., an input clock, a horizontal synchronizing signal, a vertical synchronizing signal and a data enable signal) inputted from a driving system such as a personal computer (not shown) to apply them to a timing controller 12. A low voltage differential signal (LVDS) interface and a transistor logic (TTL) interface are largely used for a data and control signal transmission to the driving system. Such interfaces may be integrated into a single chip along with the timing controller 12 by collecting each function of them.

The timing controller 12 takes advantages of a control signal inputted via the interface 10 to produce control signals for driving a data driver 18 consisting of a plurality of drive IC's (not shown) and a gate driver 20 consisting of a plurality of gate drive IC's (not shown) Also, the timing controller 12 transfers a data inputted from the interface 10 to the data driver 18. A reference voltage generator 16 generates reference voltages of a digital to analog converter (DAC) used in the data driver 18, which are established by a producer on a basis of a transmissivity to voltage characteristic of the panel. The data driver 18 selects reference voltages of an input data in response to control signals from the timing controller 12 and applies the selected reference voltage to the liquid crystal display panel 2, thereby controlling a rotation angle of the liquid crystal. The gate driver 20 makes an on/off control of the thin film transistors (TFT's) arranged on the liquid crystal panel 22 in response to the control signals inputted from the timing controller 12. Also, the gate driver 20 allows the analog image signals from the data driver 18 to be applied to each pixel connected to each TFT. A power voltage generator 14 supplies an operation voltage to each element, and generates a common electrode voltage and applies it to the liquid crystal panel 22.

FIG. 2 is a schematic block diagram showing a configuration of the timing controller in FIG. 1. In FIG. 2, the timing controller 12 includes a control signal generator 22 and a data signal generator 24. The timing controller 12 receives a horizontal synchronizing signal, a vertical synchronizing signal, a data enable signal, a clock and a data (R,G,B). The vertical synchronizing signal represents a time required for displaying one frame field. The horizontal synchronizing signal represents a time required for displaying one line of the field.

Thus, the horizontal synchronizing signal includes pulses corresponding to the number of pixels included in one line. The data enable signal represents a time supplying the pixel with a data.

The data signal generator 24 rearranges a data so that desired bits of data (R,G,B) inputted from the interface 10 can be supplied to the data driver 18. The control signal generator 22 receives the horizontal synchronizing signal, the vertical synchronizing signal, the data enable signal and the clock signal to generate various control signals and apply them to the data driver 18 and the gate driver 20. The control signals required for the data driver 18 and the gate driver 20 will be described below. Herein, the control signals used commonly other than the control signals required specially will be described.

The control signals required for the data driver 18 include source sampling clock (SSC), source output enable (SOE), source start pulse (SSP) and liquid crystal polarity reverse (POL) signals, etc. The SSC signal is used as a sampling clock for latching a data in the data driver 18, and which determines a drive frequency of the data drive IC. The SOE signal transfer a data latched by the SSC signal to the liquid crystal panel. The SSP signal is a signal notifying a latch or sampling initiation of the data during one horizontal synchronous period. The POL signal is a signal notifying the positive or negative polarity of the liquid crystal for the purpose of making an inversion driving of the liquid crystal.

The control signals required for the gate driver 20 include gate shift clock (GSC), gate output enable (GOE) and gate start pulse (GSP) signals, etc. The GSC signal is a signal determining a time when a gate of the TFT is turned on or off. The GOE signal is a signal controlling an output of the gate driver 20. The GSP signal is a signal notifying a first drive line of the field in one vertical synchronizing signal.

The control signals inputted to the data driver 18 and the gate driver 20 as mentioned above are generated by the control signals inputted from the interface 10. Thus, if no control signal is input from the interface 10, then the timing controller 12 fails to generate a control signal. In other words, if any control signals are not inputted from the interface 10 in a power-on state, then the liquid crystal panel 2 does not display a picture. If a state in which the liquid crystal panel 2 does not display a picture upon power-on is sustained, then the liquid crystal is deteriorated to leave traces. Such deteriorated traces are viewed even when the LCD make a normal display to cause a trouble of the LCD.

In order to prevent the deterioration of the liquid crystal, it is necessary that the timing controller is controlled in accordance with a presence or absence of input signal. For the controlling of the timing controller, the presence of the input signal must be determined accurately.

SUMMARY OF THE INVENTION

Accordingly, it is an object of the present invention to provide a liquid crystal display and a driving method thereof that are adaptive for detecting a presence and a frequency range of an input signal applied to the liquid crystal display.

In order to achieve these and other objects of the invention, a liquid crystal display device according to one aspect of the present invention includes a timing controller provided with a signal presence determiner for detecting an application of an input signal from an interface, wherein said signal presence determiner includes an oscillator for generating a reference clock having the same frequency as a horizontal synchronizing signal and a pre-synchronizing signal having the same frequency as a vertical synchronizing signal; a period detector for comparing a data enable signal from the exterior thereof with the reference clock to output a period of the input signal with the aid of a detection reference signal and the pre-synchronizing signal; a period comparator for comparing a period range between a desired maximum value and a desired minimum value of the input signal; and signal presence/absence comparing means for determining a presence/absence of the input signal in response to a pulse number of the input signal detected within a period range between the maximum value and the minimum value during an application interval of the detection reference signal. Herein, said period range between the maximum value and the minimum value of the period comparator can be controlled by a user. Also, said pulse number of the signal presence/absence comparing means can be controlled by a user.

A method of driving a liquid crystal display device according to another aspect of the present invention includes the steps of generating a reference clock having the same frequency as a horizontal synchronizing signal and a pre-synchronizing signal having the same frequency as a vertical synchronizing signal; comparing a data enable signal from the exterior with the reference clock to output a period of an input signal with the aid of a detection reference signal and the pre-synchronizing signal; comparing a period range between a desired maximum value and a desired minimum value of the input signal; and determining a presence/absence of the input signal in response to a pulse number of the input signal detected within a period range between the maximum value and the minimum value during an application interval of the detection reference signal.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
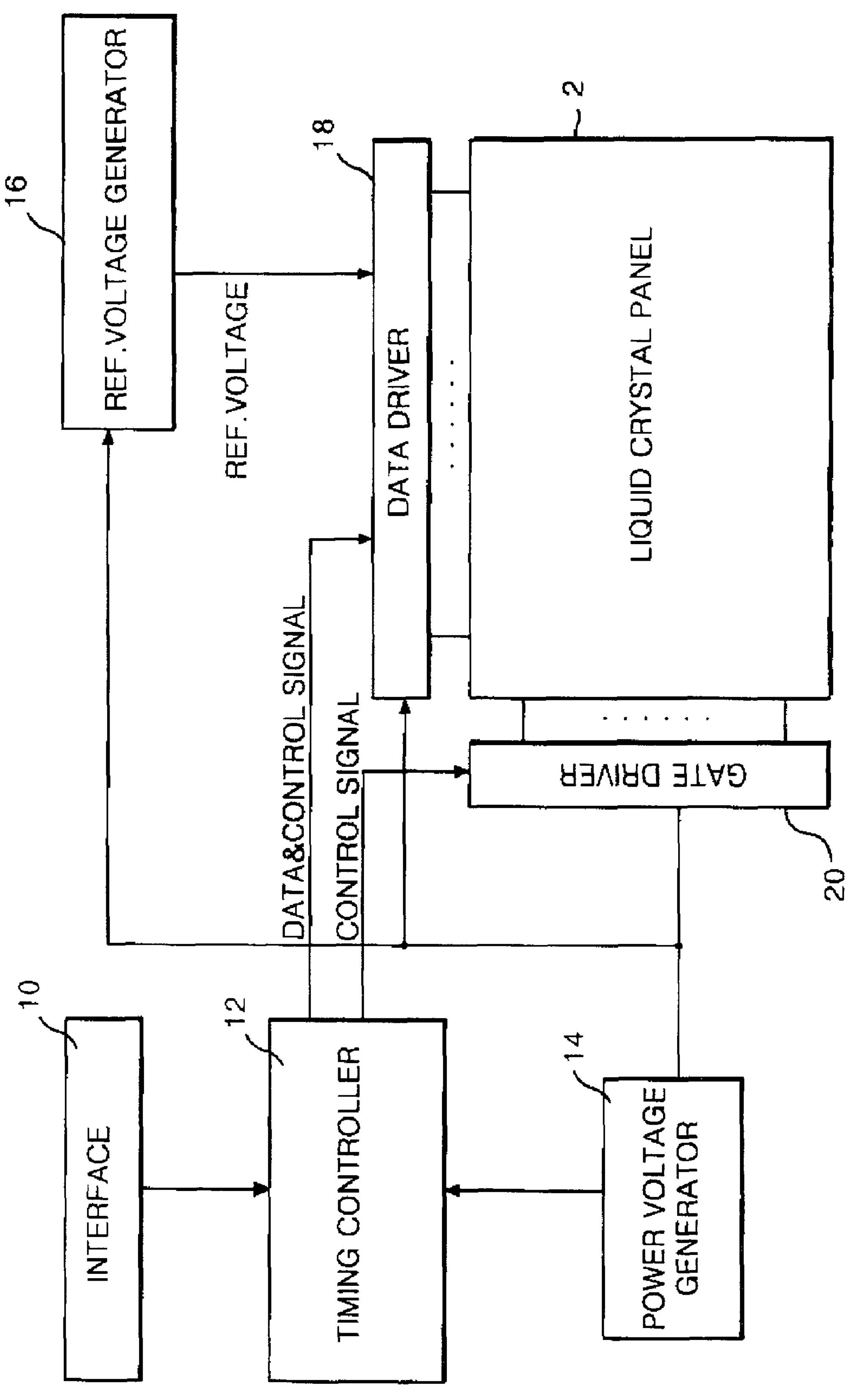
FIG. 1 PRIOR ART
FIG. 1 is a block diagram showing a configuration of a prior liquid crystal display.
Figure 2:
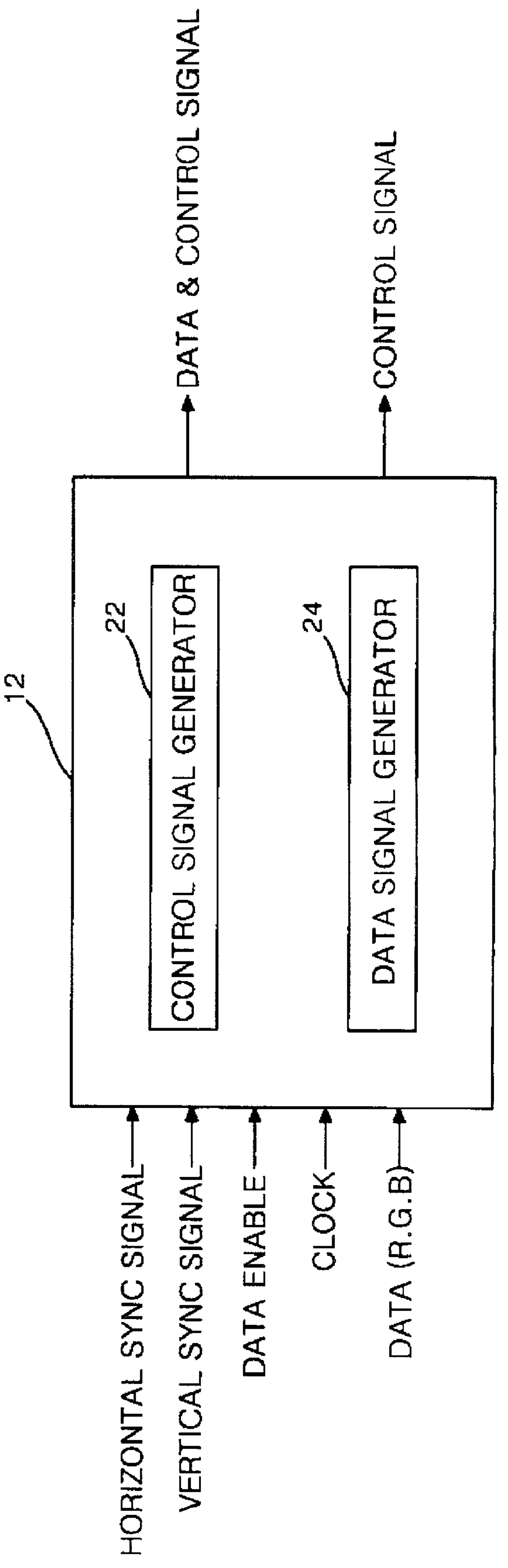
FIG.2 PRIOR ART
FIG. 2 is a schematic block diagram showing a configuration of the timing controller in FIG. 1.
Figure 3:
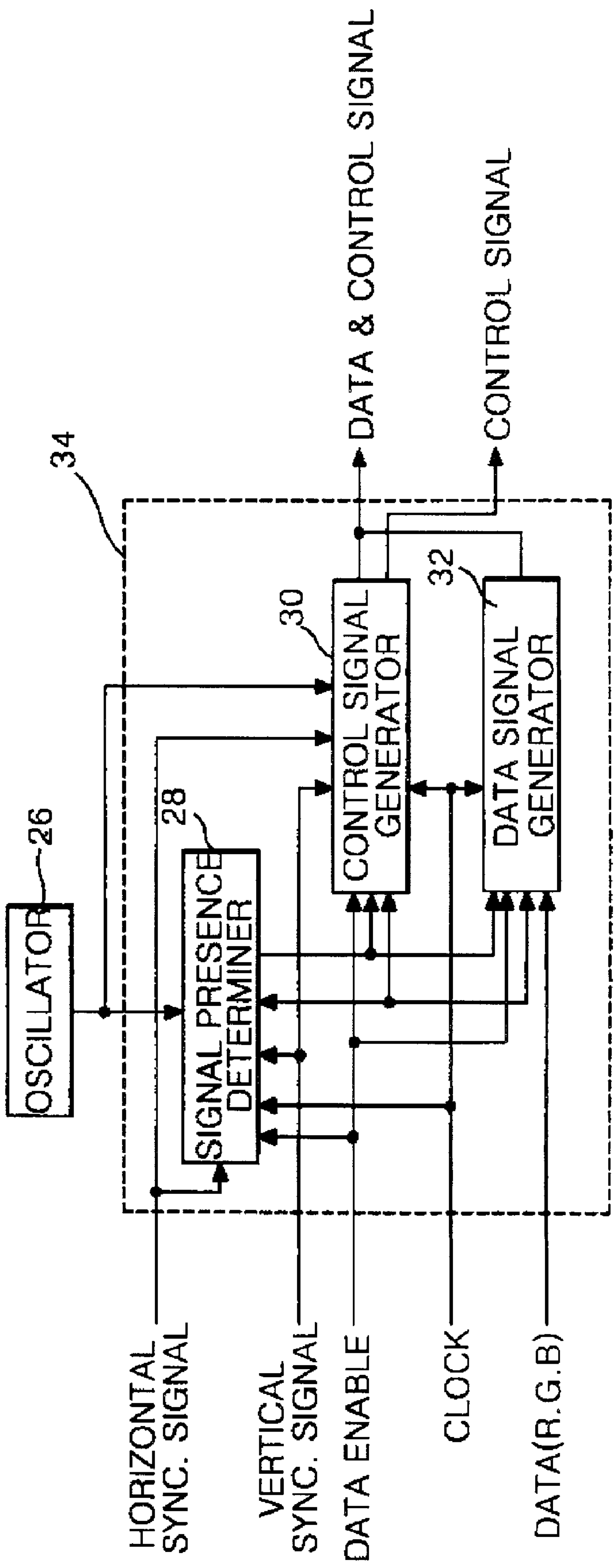
FIG. 3 is a schematic block diagram showing a configuration of a timing controller according to an embodiment of the present invention.

Referring to FIG. 3, there is shown a timing controller according to an embodiment of the present invention. The timing controller 34 includes a control signal generator 30 for receiving timing synchronizing signals of a horizontal synchronizing signal, a vertical synchronizing signal, a data enable signal and a clock pulse to generate control signals applied to a data driver 18 and a gate driver 20, a data signal generator 32 for receiving a data (R, G, B) inputted from the interface 10 and then aligning them to apply the same to the data driver 18, and a signal presence determiner 28 for detecting an application of various control signals inputted from the interface 10. The timing controller further includes an oscillator 26 for applying a desired frequency of reference signal to the signal presence determiner 28.

The control signal generator 30 receives a horizontal synchronizing signal, a vertical synchronizing signal, a data enable signal and a clock signal to generate various control signals for driving the liquid crystal display panel, and applies the generated control signals to the data driver 18 and the gate driver 20. The vertical synchronizing signal represents a time required for displaying one frame of the field. The horizontal synchronizing signal represents a time required for displaying one line of the field. Thus, the horizontal synchronizing signal includes pulses corresponding to the number of pixels included in one line. The data enable signal represents a time at which the pixel is supplied with a data.

The data signal generator 32 receives a data (R,G,B) from the interface 10, and rearranges the received data (R,G,B) so that the data can be supplied to the liquid crystal display panel 2 and then applies the same to the data driver 18. The oscillator 26 generates a desired reference clock and makes a frequency division of the reference clock to apply a pre-synchronizing signal having the same frequency as an input signal to the signal presence determiner 28.

An operation of the signal presence determiner 28 will be described with reference to FIG. 4 below.

Figure 4:
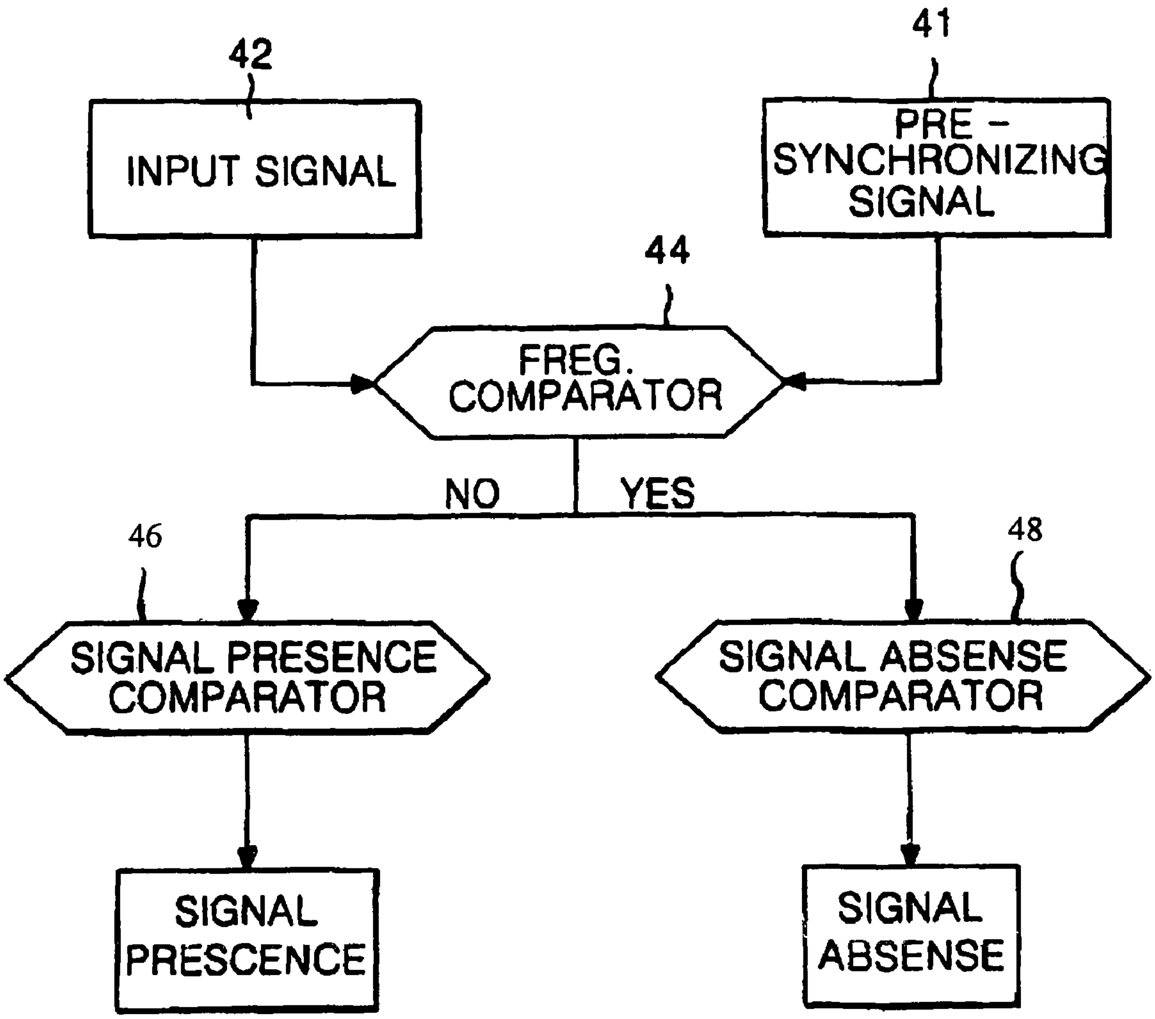
FIG. 4 is a flow chart representing an operation of an embodiment of the signal presence determiner shown in FIG. 3.
Figure 5:
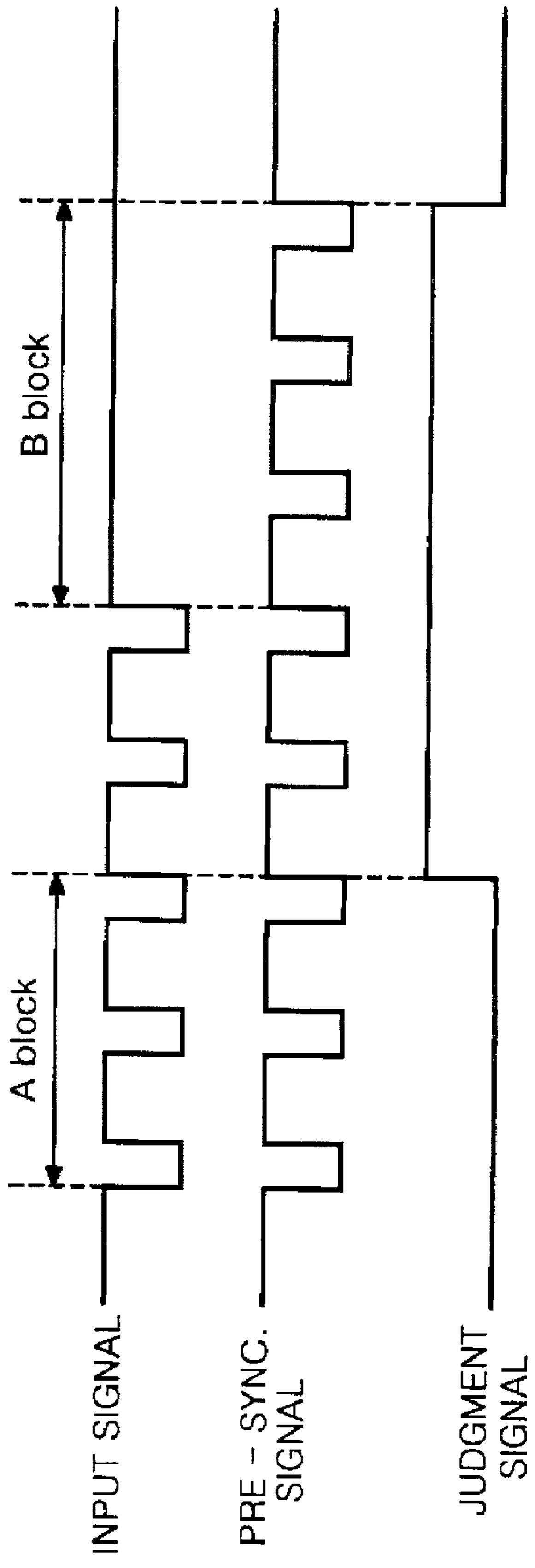
FIG. 5 is a waveform diagram representing a process of generating a judgment signal from the signal presence determiner shown in FIG. 3.

In FIG. 4, the signal presence determiner 28 includes a frequency comparator 44 for receiving an input signal 42 and a pre-synchronizing signal 41, and a signal presence comparator 46 and a signal absence comparator 48 for checking a variation in a compared frequency signal.

The input signal 42 is received from the interface 10 and the pre-synchronizing signal 41 having the same frequency as the input signal 42 is inputted from the oscillator 26 to the frequency comparator 44. The frequency comparator 44 compares a frequency of the pre-synchronizing signal 41 with that of the input signal 42. In other words, the frequency comparator 44 compares a frequency of the pre-synchronizing signal with a frequency of the input signal 42 detected during a desired period. At this time, the detected frequency has a ±5 Hz range of the pre-synchronizing signal 41.

Accordingly, a frequency within ±5 Hz compared from the frequency comparator 44 is applied to the signal presence comparator 46. The signal presence comparator 46 compares the input signal 42 with the pre-synchronizing signal 41 like the A region in FIG., 4 to apply a low-state judgment signal indicating to be an effective signal input to the control signal generator 30 when the input signal 42 is larger than a repetition number of high state or low state and a set value N. At this time, the control signal generator 30 having received a low-state judgment signal is supplied with an input signal received from the interface 10. The later operation conforms to an operation of generating a general control signal.

However, when a frequency compared at the frequency comparator is more than ±5 Hz, the input signal is applied to the signal absence comparator 48. The signal absence comparator 48 compares the input signal 42 with the pre-synchronizing signal 41 like the B region in FIG. 4 to apply a high-state judgment signal indicating to be an ineffective signal input to the control signal generator 30 when the input signal 42 is smaller than a repetition number of high state or low state and a set value N. At this time, the control signal generator 30 having received a high-state judgment signal receives the pre-synchronizing signal 41 from the oscillator 26 to display a full black, a full white or a certain picture information on the liquid crystal display panel 2.

Figure 6:
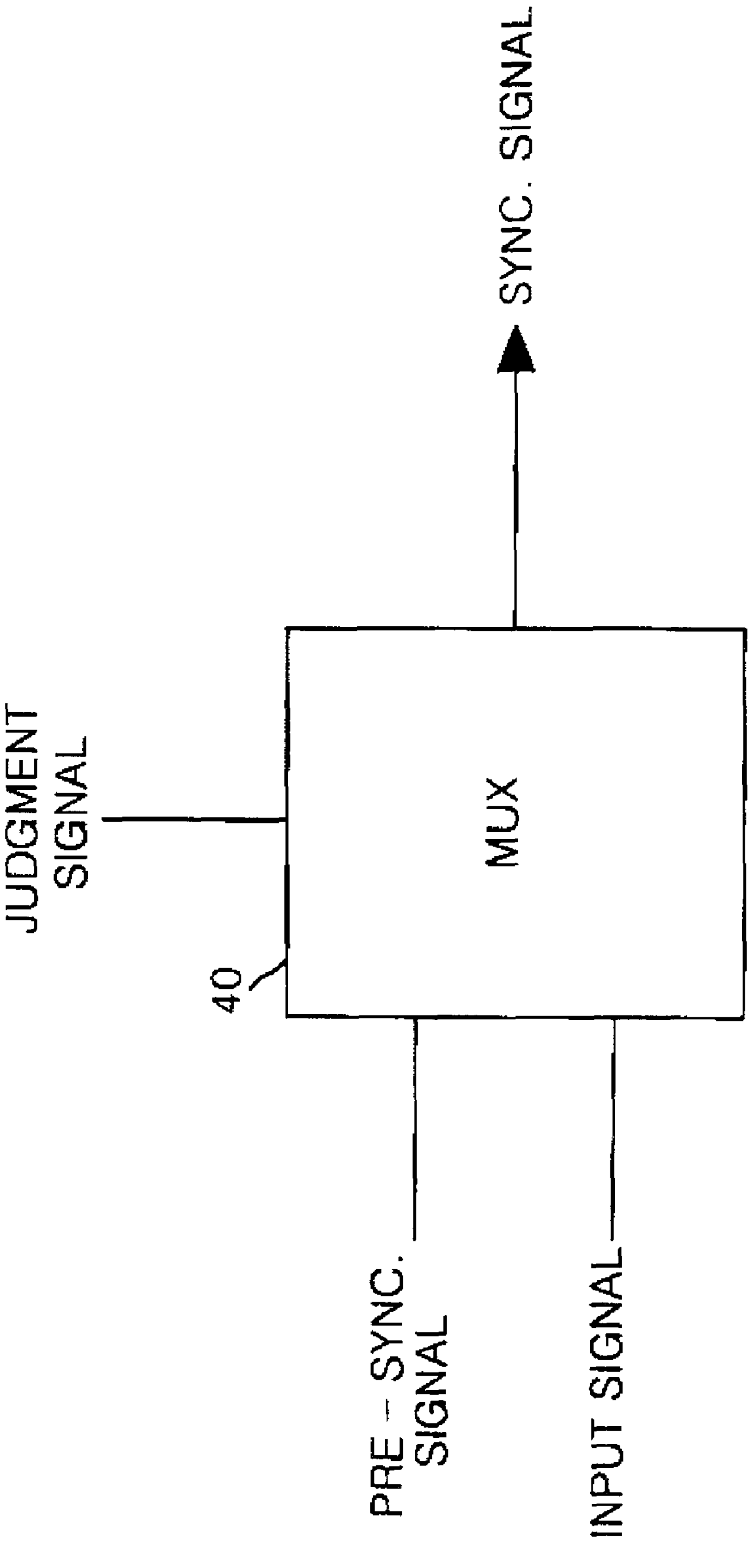
FIG. 6 is a block diagram of a multiplexor provided at the timing controller shown in FIG. 3.

To this end, the control signal generator 30 includes a multiplexor (MUX) 40 as shown in FIG. 6. Referring to FIG. 6, a pre-synchronizing signal, an input signal and a judgment signal are inputted to the MUX 40. The MUX 40 selectively outputs any one of the pre-synchronizing signal and the input signal in response to an input state of the judgment signal. The MUX 40 outputs an input signal when a low-state judgment signal is inputted from the signal presence determiner 28 while outputting a pre-synchronizing signal when a high-state judgment signal is inputted therefrom.

The control signal generator 30 generates a control signal in response to a synchronizing signal outputted from the MUX 40 and applies the control signal to the gate driver 20 and the data driver 18. At this time, the data signal generator 32 applies a data signal stored in a storage device in advance to the data driver 18.

Figure 7:
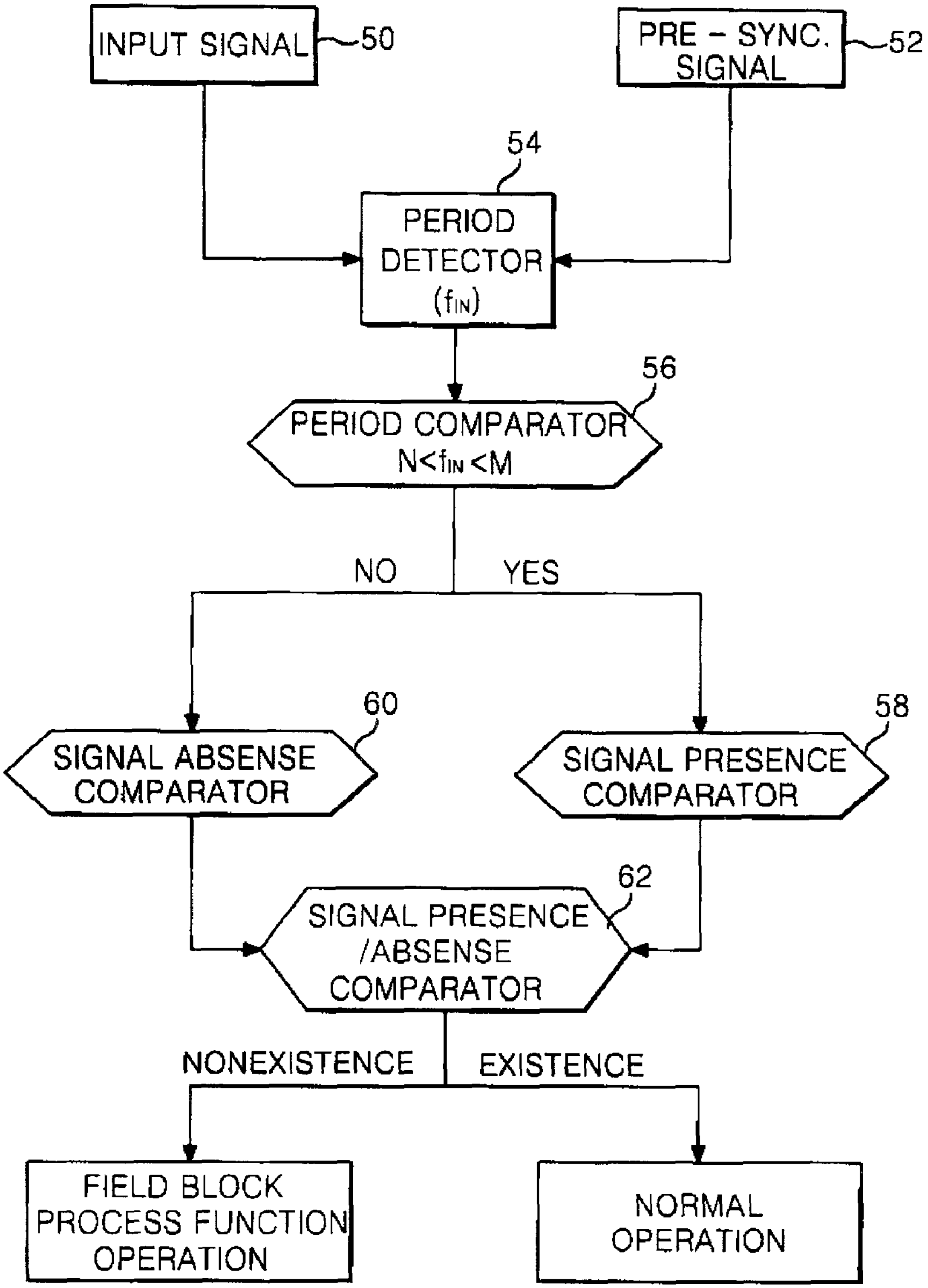
FIG. 7 is a flow chart representing an operation of another embodiment of the signal presence determiner shown in FIG. 3.

FIG. 7 is a flow chart representing an operation of another embodiment of the signal presence determiner shown in FIG. 3.

Referring to FIG. 7, the signal presence determiner includes a period detector for receiving an input signal 50 and a pre-synchronizing signal 52, a period comparator 56 for comparing the detected period range with a set period range, a signal presence comparator 58 and a signal absence comparator 60 for determining a presence of the compared period, and a signal presence/absence comparator 62 for determining a presence of a signal finally.

The period detector 54 receives the input signal 50 and the pre-synchronizing signal 52 to compare periods of them, thereby outputting a period signal Pvsync and a detection reference signal Refvsync. The period comparator 56 compares the period signal Pvsync from the period detector 54 with the set maximum (MAX) and minimum (MIN) values to output a comparator output signal COM. The signal presence comparator 58 and the signal absence comparator 60 determine a presence of an input signal Vsync in response to the comparator output signal COM from the period comparator 56 to output a judgment signal. The signal presence/absence comparator 62 finally determines a presence of the judgment signal to output a detection signal DET.

Figure 8:
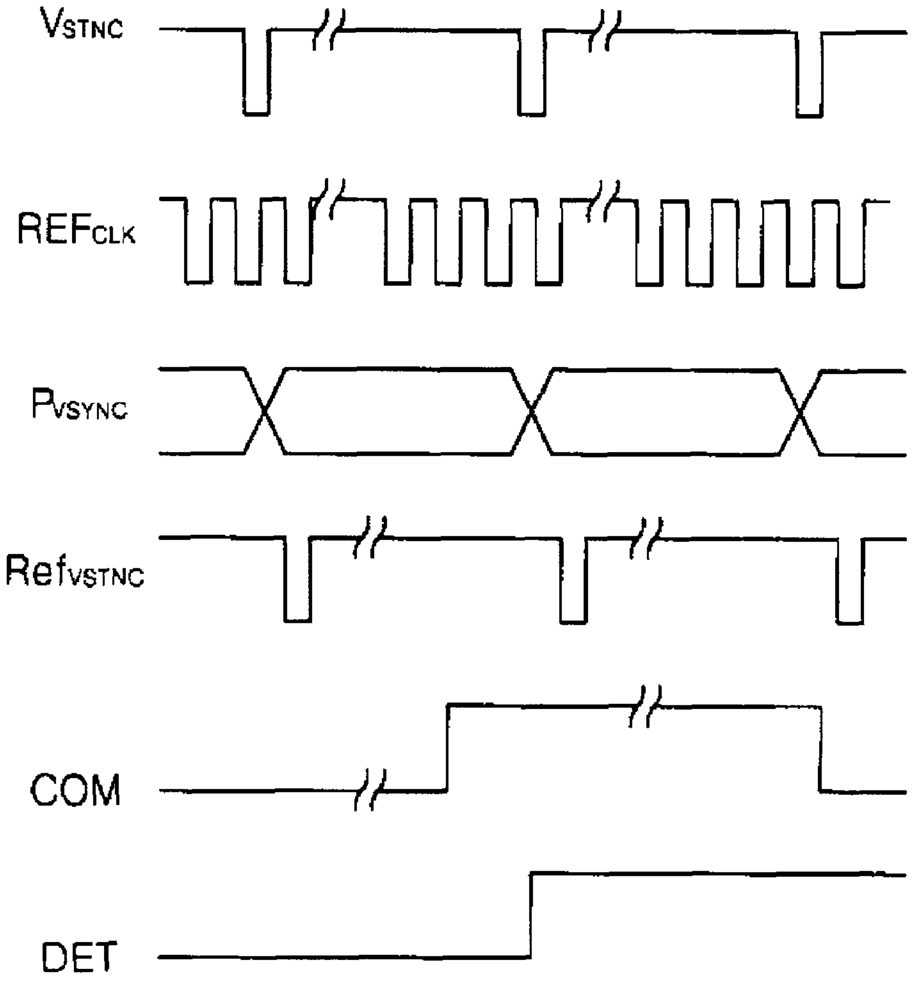
FIG. 8 is a timing diagram representing a process of generating a judgment signal from the signal presence determiner shown in FIG. 7.

As shown in FIG. 8, the signal presence determiner compares an input signal Vsync inputted from the interface 10 with a pre-synchronizing signal Refclk inputted from the oscillator 26 to output a detection signal DET.

Hereinafter, this will be described with reference to FIG. 9 to FIG. 11 in detail.

Figure 9:
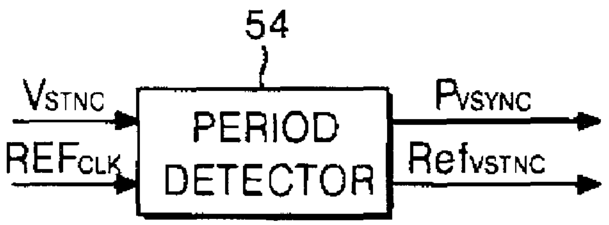
FIG. 9 is a block diagram of the period detector shown in FIG. 7.

Referring to FIG. 9, the period detector 54 has two input terminals and two output terminals. An input signal Vsync from the interface 10 is applied to a first input terminal Vsync while a pre-synchronizing signal Refclk from the oscillator 26 is applied to a second input terminal Refclk. The period detector 54 compares two signals applied to the first and second input terminals Vsync and Refclk to output a period signal Pvsync and a detection reference signal Refvsync for the input signal Vsync, and applies the same to the period comparator 56.

Figure 10:
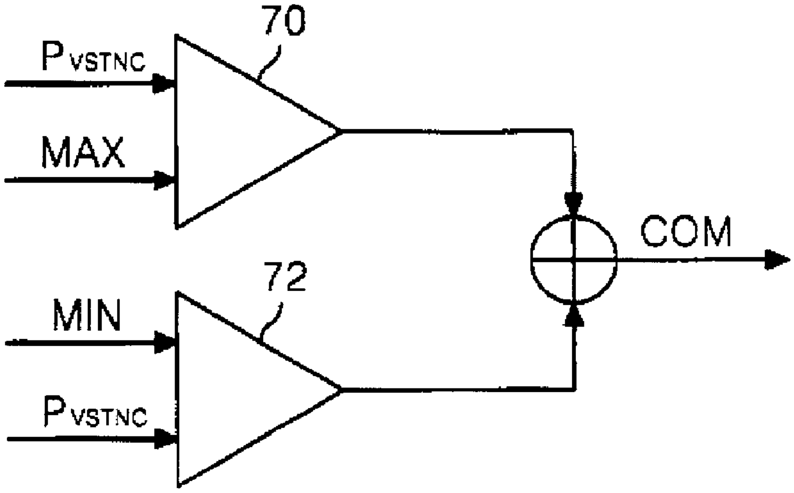
FIG. 10 is a block diagram of the period comparator shown in FIG. 7.

Referring to FIG. 10, the period comparator 56 includes a first comparator 70 having two input terminals and one output terminal, and a second comparator 72 having two input terminals and one output terminal. A period signal Pvsync detected from the period detector 54 is inputted to a first input terminal Pvsync of the first comparator 70 while a period signal MAX having a set maximum period value MAX is inputted to a second input terminal MAX thereof. A period signal MIN having a set minimum period value MIN is inputted to a first input terminal MIN of the second comparator 72 while a period signal Pvsync detected from the period detector 54 is inputted to a second input terminal thereof.

The period comparator 56 compares the period signal Pvsync from the period detector 54 with the maximum period value MAX and the minimum period value MIN of the first and second comparators 70 and 72 to detect a period range of the period signal Pvsync.

At this time, a period of the period signal Pvsync larger than the maximum period value MAX is detected at the first comparator 70 while a period of the period signal Pvsync smaller than the minimum period value MIN is detected at the second comparator 72. An output signal COM detected from the first and second comparators 70 and 72 in this manner is applied to the signal presence comparator 58 and the signal absence comparator 60. In this case, a period signal Pvsync beyond a range of the maximum and minimum periods MAX and MIN is applied to the signal absence comparator 60, whereas a period signal Pvsync within the maximum and minimum periods MAX and MIN is applied to the signal presence comparator 58.

Figure 11:
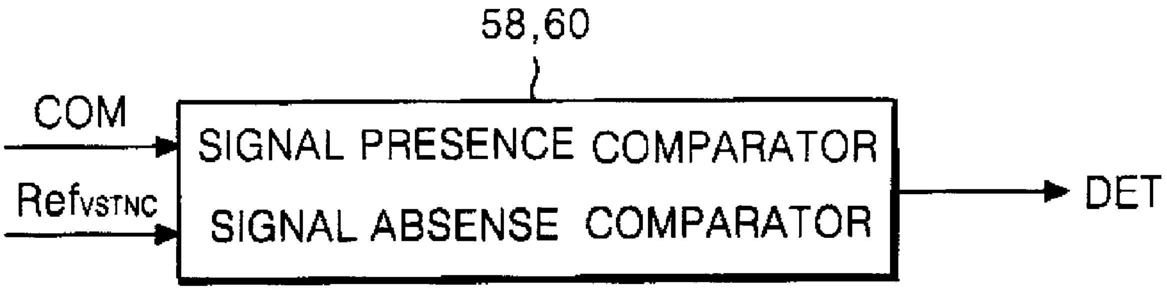
FIG. 11 is a block diagram of the signal presence/absence comparator shown in FIG. 7.

Referring to FIG. 11, the signal presence comparator 58 and the signal absence comparator 60 have two input terminal and one output terminal. An output signal COM within a range set at the period comparator 56 is a first input terminal COM of the signal presence comparator 58 while a detection reference signal Refvsync from the period detector 54 is applied to a second input terminal Refvsync thereof.

Accordingly, the signal presence comparator 58 determines to be a presence signal DET when the number of continuous pulses of the output signal COM during an input interval of the detection reference signal Refvsync is larger than a set P value. For instance, it determines to be a signal presence if a pulse having continuous "1" values is larger than a set 5 value; whereas it determines to be a signal absence if not. The presence signal DET determined in this manner is applied to the signal presence/absence comparator 62. Herein, the set P value can be controlled by a user.

An output signal COM beyond a range set from the period comparator 56 is a first input terminal COM of the signal absence comparator 60 while a detection reference signal Refvsync from the period detector 54 is applied to a second input terminal Refvsync thereof.

Accordingly, the signal absence comparator 60 determines to be an absence signal DET when the number of continuous pulses of the output signal COM during an input interval of the detection reference signal Refvsync is smaller than a set P value. The absence signal DET determined in this manner is applied to the signal presence/absence comparator 62.

In the signal presence/absence comparator 62, an input signal 50 determined to be a presence signal from the signal presence comparator 58 and the signal absence comparator 60 outputs a signal corresponding to a normal operation. On the other hand, an input signal 50 determined to be an absence signal is applied to the control signal generator 30 to receive a pre-synchronizing signal from the oscillator 26, thereby outputting a full black, a full white or a certain pre-stored data. At this time, the certain data allows a black data or a text data, etc. showing an absence signal input state to be displayed on the liquid crystal display panel 2.

As described above, according to the present invention, the signal presence/absence determiner of the timing controller further includes the period detector and the period comparator, thereby detecting a presence/absence of an input signal from the interface. Furthermore, a frequency range of the input signal is detected, so that it becomes possible to support various frequency ranges of a liquid crystal module for a monitor.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a display comprising:

receiving an input signal having a first period corresponding to a number of lines in the display;

generating a detection reference signal to compare periods of the input signal and a pre-synchronizing signal;

determining whether the first period is less than a first reference period;

outputting a signal of a first state to a signal presence comparator only if the first period is less than the first reference period;

outputting the signal of the first state to a signal absence comparator only if the first period is beyond a range of the first reference period;

determining the presence of the input signal if the number of pulses of the signal of the first state outputted to the signal presence comparator is larger than a predetermined plural number during an input interval of the detection reference signal, being different from the signal of the first state, wherein each of the pulses is to be of the first state and continuously has same values; and determining the absence of the input signal if the number of pulses of the signal of the first state outputted to the signal absence comparator is smaller than a predetermined plural number during an input interval of the detection reference signal, being different from the signal of the first state, wherein each of the pulses is to be of the first state and continuously has same values.

2. The method according to claim 1, wherein the receiving, generating, determining and outputting steps are repeated and determining if the first state is output a second time.

3. A method of driving a display comprising:

receiving an input signal having a first period corresponding to a number of lines in the display;

generating a detection reference signal to compare periods of the input signal and a pre-synchronizing signal;

determining whether the first period is greater than a first reference period;

outputting a signal of a first state to a signal presence comparator only if the first period is greater than the first reference period;

outputting the signal of the first state to a signal absence comparator only if the first period is beyond a range of the first reference period;

determining the presence of the input signal if the number of pulses of the signal of the first state outputted to the signal presence comparator is larger than a predetermined plural number during an input interval of the detection reference signal, being different from the signal of the first state, wherein each of the pulses is to be of the first state and continuously has same values; and determining the absence of the input signal if the number of pulses of the signal of the first state outputted to the signal absence comparator is smaller than a predetermined plural number during an input interval of the detection reference signal, being different from the signal of the first state, wherein each of the pulses is to be of the first state and continuously has same values.

4. The method according to claim 3, wherein the receiving, generating, determining and outputting steps are repeated and determining if the first state is output a second time.

5. A method of driving a display comprising:

receiving an input signal having a first period corresponding to a number of lines in the display;

generating a detection reference signal to compare periods of the input signal and a pre-synchronizing signal;

determining whether the first period is less than a first reference period and greater than a second reference period;

outputting a signal of a first state to a signal presence comparator only if the first period is less than the first reference period and greater than the second reference period;

outputting the signal of the first state to a signal absence comparator only if the first period is beyond a range of the first reference period and the second reference period;

determining the presence of the input signal if the number of pulses of the signal of the first state outputted to the signal presence comparator is larger than a predetermined plural number during an input interval of the detection reference signal, being different from the signal of the first state, wherein each of the pulses is to be of the first state and continuously has same values; and determining the absence of the input signal if the number of pulses of the signal of the first state outputted to the signal absence comparator is smaller than a predetermined plural number during an input interval of the detection reference signal, being different from the signal of the first state, wherein each of the pulses is to be of the first state and continuously has same values.

6. The method according to claim 5, wherein the receiving, generating, determining and outputting steps are repeated and determining if the first state is output a second time.

* * * * *